(12) United States Patent
Orimo et al.

(10) Patent No.: US 7,790,208 B2
(45) Date of Patent: Sep. 7, 2010

(54) PROCESS FOR PRODUCING RICH-FLAVOR SOY SAUCE

(75) Inventors: Yoshikazu Orimo, Choshi (JP); Tatsuo Yamazaki, Asahi (JP)

(73) Assignee: Yamasa Corporation, Chiba (JP)

( * ) Notice: Subject to any disclaimer, the term of this patent is extended or adjusted under 35 U.S.C. 154(b) by 1010 days.

(21) Appl. No.: 11/049,652

(22) Filed: Feb. 4, 2005

(65) Prior Publication Data

US 2005/0170046 A1 Aug. 4, 2005

(30) Foreign Application Priority Data

Feb. 4, 2004 (JP) ............................. 2004-027620
Jan. 12, 2005 (JP) ............................. 2005-005288

(51) Int. Cl.
*A23L 1/20* (2006.01)

(52) U.S. Cl. ............................. 426/46; 426/44; 426/49; 426/52; 426/589; 426/60; 426/62; 426/51; 435/244; 435/245

(58) Field of Classification Search .................. 426/44, 426/46, 49, 52, 589, 60, 62, 51; 435/244, 435/245

See application file for complete search history.

(56) References Cited

U.S. PATENT DOCUMENTS 4,476,144 A    10/1984  Kitahara et al. ................ 426/46

FOREIGN PATENT DOCUMENTS

JP         58-138356    *  8/1983

OTHER PUBLICATIONS

Beans-Arcega, L. et al. 1996. Indigenous amino acid/peptide sauces and pastes with meatlike flavors. pp. 509-654. In Keith H. Steinkraus. 1996. Handbook of Indigenous Fermented Foods. 2nd edition. Marcel Dekker Inc. New York.*
Patent Abstracts of Japan, Publication No. 05-123132, May 21, 1993.
Patent Abstracts of Japan, Publication No. 07-031411, Feb. 3, 1995.
Patent Abstracts of Japan, Publication No. 10-179083, Jul. 7, 1998.
Patent Abstracts of Japan, Publication No. 2001-061437, Mar. 13, 2001.
Esp@cenet Abstract of JP19810107146 published Jan. 20, 1983 corresponding to US 4,476,144.

* cited by examiner

*Primary Examiner*—Keith D Hendricks
*Assistant Examiner*—Hamid R Badr
(74) *Attorney, Agent, or Firm*—Wenderoth, Lind & Ponack, L.L.P.

(57) ABSTRACT

A process of producing a rich-flavor soy sauce, including mixing soy sauce koji and salt water in a tank for preparing moromi mash, adding soy sauce and soy sauce koji at an appropriate point in time during the period of fermentation and aging, and subsequently effecting further aging. The process does not require any special treatment, and is quite convenient, in that it employs conventional process steps for producing a soy sauce. The resultant soy sauce has a light color and yet gives a rich flavor comparable to that of regular soy sauce, has a rich taste comparable to that of saishikomi-shoyu having a total nitrogen content of not less than 2% (W/V), and is mild in terms of saltiness.

3 Claims, No Drawings

PROCESS FOR PRODUCING RICH-FLAVOR SOY SAUCE

BACKGROUND OF THE INVENTION

1. Field of the Invention

The present invention relates to a process for producing a honjozo-type (which means that flavor is developed without use of any artificial additives) soy sauce having a rich flavor.

2. Background Art

A typical example of rich-flavor soy sauce is a saishikomi-shoyu (saishikoini is a Japanese word which means "double brewed") or kanro-shoyu (kanro is a Japanese word which means nectar). The saishikomi-shoyu is produced through several steps, including adjustment of salt concentration of a raw regular soy sauce by use of salt water, incorporation of soy sauce koji (which means an enzyme preparation produced by growing a koji mold on a mixture of roasted-crushed wheat and boiled soybeans for soy sauce) into the raw regular soy sauce, and fermentation-aging of the resultant mixture for several months with or without addition of yeast. The thus-produced saisbikomi-shoyu is characterized in that it has a high nitrogen content (normally, TN (total nitrogen)≧2 wt.% (W/V)) and that it has a dark color and a rich taste.

However, because of a process-related factor unique to the production process of the saishikomi-shoyu, the produced saishikomi-shoyu tends to have a flavor different from that of a well-accepted, typical regular soy sauce. That is, in the manufacture of a saishikomi-shoyu, salt water (which is generally employed for producing a regular soy sauce) is replaced by regular soy sauce, and this replacement hinders the growth of yeast in moromi mash, to thereby slow the alcoholic fermentation process of moromi mash. The slowed process produces a product having a different flavor, which is less favored by consumers who are accustomed to the flavor of regular soy sauce.

Hitherto, a variety of attempts have been made to overcome the above-mentioned drawbacks involved in saishikomi-shoyu and to produce a rich-flavor soy sauce which does not have such a problem. Some such attempts are: (1) a process including separating a liquid from moromi mash in the early stage of preparation for the fermentation process; adding soy sauce koji to the separated liquid which serves as shikomi-mizu (i.e., water which is used to prepare moromi mash in a large container; hereinafter referred to simply as shikomi water); and then performing routine fermentation and aging processes (Japanese Patent Publication (kokoku) No. 20/1989); (2) a process including extracting, with water or hydrated alcohol, oligosaccharides and organic acids from defatted soybeans serving as a raw material; heating the residue for denaturing proteins; mixing with a carbohydrate source material; inoculating the resultant mixture with a koji mold to thereby prepare koji; adding salt water to the koji for preparing the moromi mash, and then performing routine fermentation and aging processes (Japanese Patent Application Laid-Open (kokai) No 123132/1993); (3) a process including steaming soybeans, followed by extraction with water or warm water, to thereby yield a sugar-containing solution; preparing salt water using, as part or the entirety of shikomi water, the sugar-containing solution; adding the thus-prepared salt water to soy sauce koji which has been obtained through a routine method for preparing moromi mash; and then performing routine fermentation and aging processes (Japanese Patent No. 3274544); (4) a process for producing a rich-flavor soy sauce by mixing soy sauce koji and soy sauce, fermenting the mixture, followed by aging, wherein the soy sauce koji is prepared from rice, and the soy sauce (serving as a raw material) is a rice-based shoyu, followed by routine fermentation and aging processes (Japanese Patent Application Laid-Open (kokai) No. 179083/1998); and (5) a process for producing a saishikomi-shoyu, in which the temperature of moromi mash is maintained at 15 to 23° C. from the beginning to the end of the fermentation and aging process, with the fermentation and aging process being effected by the addition of yeast capable of inducing specific alcoholic fermentation (Japanese Patent Application Laid-Open (kokai) No. 2001-61437).

However, all these conventional processes are not necessarily convenient, because they require any of the following steps: (1) a pressing step of pressing moromi mash in the early stage of fermentation; (2) an extraction step of extracting, with water or hydrated alcohol, oligosaccharides and organic acids from defatted soybeans serving as a raw material; (3) a steaming step of soybeans, after which water or warm water is used to yield a sugar-containing solution; (4) a provision step in which rice-based koji and rice-based shoyu are prepared in advance; and (5) an isolation step for obtaining yeast capable of inducing specific alcoholic fermentation.

In view of the foregoing, the present inventors have devoted their research efforts to provision of a convenient production process of a rich-flavor soy sauce, which uses the processing steps of conventional soy sauce brewing, without requiring any special treatment.

During the course of their research, they have found that addition of soy sauce and soy sauce koji at an appropriate point in time during fermentation of ordinary regular soy sauce and subsequent aging successfully provides an excellent soy sauce which has a light color and yet gives a rich flavor comparable to that of regular soy sauce, has a total nitrogen content of not less than 2% (W/V), and has a taste comparable to that of saishikomi-shoyu. The present invention has been achieved on the basis of this finding.

SUMMARY OF THE INVENTION

Accordingly, the present invention provides a process of producing a rich-flavor soy sauce comprising mixing soy sauce koji and salt water in a tank for preparing moromi mash, adding soy sauce and soy sauce koji at an appropriate point in time during the period of fermentation and aging, and subsequently effecting further aging.

DETAILED DESCRIPTION OF THE INVENTION AND PREFERRED EMBODIMENTS

The process of the present invention is very convenient, requiring no special treatment at all, and can be carried out by simply replacing, in a series of conventional soy sauce making steps, a certain step with another. Nevertheless, the resultant product is a soy sauce having a rich flavor, which falls in the category of honjozo-shoyu, has a total nitrogen content of not less than 2% (W/V), and has a taste comparable to that of saishikomi-shoyu.

Conventional processes for producing saishikomi-shoyu inevitably yield dark-colored soy sauce products, because of high levels of nitrogen and reducing sugar. Moreover, the processes tend to suffer from insufficient fermentation. These disadvantages have remained unsolved in the art until the present invention. According to the present invention, since the timing of addition of soy sauce and soy sauce koji can be arbitrarily changed in accordance with needs, insufficient fermentation is prevented, and light-color honjozo-shoyu having a flavor comparable to that of regular soy sauce can be obtained.

No particular limitation is imposed on the soy sauce koji which is employed in the present invention, and there may be employed any type of soy sauce koji prepared according to the conventional soy sauce koji making process. For example, it can be prepared through the following process: combining heat-denatured—e.g., steam-denatured—soybeans, defatted soybeans, or like soybeans with roasted and crushed wheat (or processed wheat) to prepare a mixture, and inoculating the mixture with a koji mold for soy sauce (such as *Aspergillus oryzae* or *Aspergillus sojae*) for effecting conventional cultivation. Specific examples of such soy sauce koji include those generally used for producing regular soy sauce, light-colored soy sauce, tamari-shoyu, or clear soy sauce (shiro-shoyu). Proportions of raw materials and process conditions may be appropriately selected from those conventionally employed.

By use of the thus-prepared soy sauce koji and salt water, the fermentation process is allowed to proceed in a conventional manner. The fermentation system is stirred from time to time while undergoing monitoring for the conditions of moromi mash, which is conventionally performed in soy sauce making.

During the process of fermentation and aging, as described above, soy sauce and soy sauce koji are added at an appropriate timing, followed by further aging, and these points are major characteristic features of the present invention.

The soy sauce to be added may be raw (non-pasteurized) soy sauce (in other words, freshly made soy sauce) or pasteurized soy sauce, and specific examples include regular soy sauce, light-colored soy sauce, clear soy sauce, "chemical" soy sauce (a so-called amino-acid soy sauce), semichemical soy sauce (shinshiki-shoyu), and a soy-sauce-like seasoning (such as enzymatically hydrolyzed vegetable protein). Any of these soy sauces may be used in a non-pasteurized state or in a pasteurized state. Moreover, the soy sauce to be added may be used as is or after dilution with water or salt water.

Examples of the soy sauce koji to be added are those listed above as examples of the soy sauce koji serving as a starting material. The type of the soy sauce to be added and the type of the soy sauce koji to be added—in other words, the type of the soy sauce for which the soy sauce koji to be added is employed—may be the same or different.

Also, the type of the soy sauce koji used as a starting material of the fermentation process and the type of the soy sauce koji used as an additional material in the middle of the fermentation process may be the same or different.

The timing at which the soy sauce and soy sauce koji are added may be arbitrarily determined. Preferably, they are added after completion of alcoholic fermentation.

The amount of soy sauce to be added and the amount of soy sauce koji to be added are each equal to or less than the amount of the moromi mash initially placed in the brewing container, and preferably, 10 to 50% by weight of the amount of the initially placed moromi mash. The ratio of the additional soy sauce koji to the additional soy sauce is preferably 1:0.5 to 1:2 by weight.

The monitoring or control of moromi mash after addition of soy sauce koji and soy sauce is carried out as performed in conventional soy sauce making. For example, the temperature of moromi mash is maintained at 15° C. to 30° C., preferably 20° C. to 28° C., and fermentation-aging is allowed to proceed for about 3 to 6 months in accordance with the timing of addition, whereby a rich-flavor soy sauce of the present invention is obtained.

EXAMPLES

The present invention will next be described by way of examples, which should not be construed as limiting the invention thereto.

Example 1

Soybeans (4.5 kg) were soaked in water, and steamed under pressure. Separately, wheat (4 kg) was roasted and crushed. The two materials were mixed to prepare a soybean-wheat mixture, and then inoculated with koji mold. The inoculated mixture was placed in an aerated koji-making apparatus, whereby soy sauce koji was obtained. The thus-prepared soy sauce koji (2.5 kg) was mixed in a tank together with 24 wt. % salt water (3.5 L) (day 0). Under occasional stirring, the moromi mash was monitored and the temperature thereof was controlled to 15° C. from day 0 to day 14, and between 25 and 28° C. from day 15 to day 180.

During the course of monitoring and control, soy sauce koji (1.5 kg) and non-pasteurized regular soy sauce (1 L; product of Yamasa Corporation) produced from whole soybeans and wheat, each prepared as described above, were added. Addition was effected at different points in time for the purpose of comparison; i.e., on day 0 (Control 1), on day 21 (upon completion of lactic acid fermentation; Invention Product 1), on day 42 (during alcoholic fermentation; Invention Product 2), and on day 63 (upon completion of alcoholic fermentation; Invention Product 3), and moromi mash was monitored and controlled as before, to thereby produce soy sauce samples.

On day 180, the moromi mash was pressed and filtered, and the resultant soy sauce products were analyzed for several evaluation items. The results are shown in Table 1. The analysis was performed in accordance with "Shoyu-shikenho (Soy Sauce Test Methods)" (published by The Japan Soy Sauce Institute).

TABLE 1

|  | Control 1 (Day 0 of addition) | Invention Product 1 (Day 21) | Invention Product 2 (Day 42) | Invention Product 3 (Day 63) |
| --- | --- | --- | --- | --- |
| T-N (wt. %) | 2.38 | 2.39 | 2.40 | 2.39 |
| FN Ratio (wt. %) | 55.5 | 54.9 | 54.5 | 54.8 |
| GN Ratio (wt. %) | 5.85 | 5.68 | 5.79 | 5.74 |
| Alcohol (wt. %) | 2.13 | 1.98 | 2.44 | 2.26 |
| pH | 4.95 | 4.87 | 5.00 | 4.99 |
| Sugar (wt. %) | 7.97 | 8.01 | 6.91 | 7.81 |
| Salt (wt. %) | 15.45 | 15.54 | 15.42 | 15.66 |
| Color No.*[1] | 6 | 8 | 9 | 11 |

*[1]Chromaticity No. (=color No.): A higher No. indicates a lighter color.

As is shown in Table 1, the soy sauce samples produced by the process of the present invention show definitely lighter colors as compared with the control soy sauce produced through a conventional method.

The respective soy sauce samples were then subjected to heat treatment and dregs removal treatment, to thereby produce heat-treated soy sauce samples. The samples were organoleptically evaluated by 8 panelists using the four-point-based preference test. Specifically, for each of the items of flavor, taste, and overall evaluation, the panelists determined ranking, and the assigned rank Nos. were averaged. Therefore, the lower the figure, the more preferred the sample. The results of the four-point-based preference test are shown in Table 2.

TABLE 2

| Evaluation Item | Control 1 (Day 0 of addition) | Invention Product 1 (Day 21) | Invention Product 2 (Day 42) | Invention Product 3 (Day 63) |
| --- | --- | --- | --- | --- |
| Flavor | 3.13 | 2.63 | 2.13 | 2.13 |
| Taste | 3.38 | 3.00 | 2.13 | 1.50 |
| Overall | 3.25 | 3.25 | 3.00 | 1.63 |

As is apparent from Table 2, in overall evaluation, the soy sauce of Invention Product 3 is remarkably excellent as compared with the control soy sauce, particularly in terms of taste.

In summary, soy sauces produced through the process of the present invention are of the rich-flavor type, having a high nitrogen content comparable to that of salshikomi-shoyu and yet presenting a light color as compared with conventional saishikomi-shoyu, and have a favorable taste.

Example 2

Soy sauce koji produced in a similar manner to that described in Example 1 and 24-wt. % salt water were mixed in a tank at a ratio (by weight) of 5:7. The moromi mash was monitored and the temperature thereof was controlled to fall between 20° C. and 30° C. from day 0 to day 60, and at 25° C. from day 60 to day 180. On day 63, additional regular soy sauce and additional soy sauce koji produced from whole soybeans and wheat, each in an amount 20 to 50% equivalent to the amount of moromi mash (2.2 kg), were added at a ratio (by weight) of 5:7, and moromi mash was monitored and controlled as before, to thereby produce soy sauce samples.

On day 180, the moromi mash was pressed and filtered, and the resultant soy sauce products were analyzed for several evaluation items. The results are shown in Table 3.

TABLE 3

| Evaluation Item | Invention Product 4 (20% added) | Invention Product 5 (30% added) | Invention Product 6 (40% added) | Invention Product 7 (50% added) |
| --- | --- | --- | --- | --- |
| T-N (wt. %) | 2.04 | 2.14 | 2.31 | 2.41 |
| FN Ratio (wt. %) | 57.0 | 56.3 | 55.6 | 54.6 |
| GN Ratio (wt. %) | 5.87 | 5.74 | 5.49 | 5.36 |
| Alcohol (wt. %) | 2.22 | 2.21 | 1.91 | 1.91 |
| pH | 5.01 | 5.03 | 5.06 | 5.10 |
| Sugar (wt. %) | 6.11 | 6.96 | 7.49 | 8.66 |
| Salt (wt. %) | 15.75 | 15.43 | 15.17 | 14.65 |
| Color No. | 20 | 18 | 15 | 13 |

As is apparent from Table 3, when the percentage of the amount of addition increases, T-N, pH, and sugar content tend to increase, whereas FN ratio, GN ratio, salt content, and color No. tend to decrease.

Example 3

The production process performed for preparing the Invention Product 4 in Example 2 was repeated, except that on day 63, addition of regular soy sauce and kolt (each in an amount of 20% equivalent) was not effected, whereby conventional regular soy sauce was obtained (Control 2). The total nitrogen and the salt concentration of each of the soy sauce samples of Invention Product 4 and Control 2 were adjusted to 1.65 wt. % and 16.5 wt. %, respectively. The samples were then subjected to heat treatment. The respective soy sauce samples were evaluated for saltiness.

Briefly, saltiness was evaluated as follows. Firstly, reference samples were prepared by increasing the salt content in increments of 1% to produce samples having salt contents ranging from 13 wt. % to 18 wt. %. Then, each panelist tasted a soy sauce sample for evaluation, and selected one reference sample that the panelist thought to have the same level of saltiness. The salt contents of the thus-selected reference samples were compared with the salt content of the test samples.

Average values of evaluation rated by 8 panelists are shown in Table 4.

TABLE 4

| | Average Salt Content (%) |
| --- | --- |
| Invention Product 4 | 15.33 |
| Control 2 | 16.42 |

As is apparent from Table 4, the saltiness of the soy sauce of the present invention is perceived to be milder; specifically, perceived to have a salt content about 1% lower than ordinary regular soy sauce, even though the total nitrogen levels are the same. Thus, the soy sauce of the present invention was proven to be a mild soy sauce that does not impart sharp saltiness.

What is claimed is:

1. A process of producing a rich-flavor soy sauce having a total nitrogen content of 2 wt. % or more, comprising mixing soy sauce koji and salt water in a tank for preparing moromi mash, allowing fermentation and aging to occur, wherein alcoholic fermentation occurs during the period of fermentation and aging, adding soy sauce having a total nitrogen content of 1.5 wt. % or more and soy sauce koji after completion of the alcoholic fermentation, and subsequently effecting further aging.

2. The process according to claim 1, further comprising diluting the added soy sauce with water or salt water prior to use.

3. The process according to claim 1, wherein the soy sauce koji is selected from the group consisting of those produced by *Aspergillus oryzae* or *Aspergillus sojae*.

* * * * *